United States Patent [19]
Cole

[11] Patent Number: 4,920,634
[45] Date of Patent: May 1, 1990

[54] PERMANENT MAGNET ROTOR WITH MAGNET RETENTION BAND

[75] Inventor: Robert L. Cole, Ludlow Falls, Ohio

[73] Assignee: A. O. Smith Corporation, Milwaukee, Wis.

[21] Appl. No.: 357,080

[22] Filed: May 25, 1989

Related U.S. Application Data

[62] Division of Ser. No. 190,703, May 5, 1988, Pat. No. 4,855,630.

[51] Int. Cl.$^5$ ............................................. H02K 15/02
[52] U.S. Cl. ................................................... 29/598
[58] Field of Search .................. 29/598; 310/262, 271, 310/156, 42

[56] References Cited

U.S. PATENT DOCUMENTS

| | | | |
|---|---|---|---|
| 583,991 | 6/1897 | Geisenhöner | 310/271 |
| 3,132,270 | 5/1964 | Phelon | 310/271 |
| 4,296,544 | 10/1981 | Burgmeier et al. | 29/598 |
| 4,417,167 | 11/1983 | Ishii et al. | 310/67 |
| 4,433,261 | 2/1984 | Nashiki et al. | 310/156 |
| 4,549,341 | 10/1985 | Kasablan | 29/598 |
| 4,625,135 | 11/1986 | Kasablan | 310/156 |
| 4,631,435 | 12/1986 | McCarty | 310/156 |
| 4,633,113 | 12/1986 | Patel | 310/156 |
| 4,638,200 | 1/1987 | Le Corre et al. | 310/156 |
| 4,656,379 | 4/1987 | McCarty | 310/181 |
| 4,674,178 | 6/1987 | Patel | 29/358 |

FOREIGN PATENT DOCUMENTS

| | | | |
|---|---|---|---|
| 1017193 | 12/1952 | France | 310/156 |
| 104872 | 6/1924 | Switzerland | 310/156 |

Primary Examiner—P. W. Echols
Attorney, Agent, or Firm—Andrus, Sceales, Starke & Sawall

[57] ABSTRACT

A rotor structure for a dynamoelectric machine including a magnetic core having a cylindrical outer surface. Equicircumferentially spaced permanent magnets are secured to the face of the core with gaps therebetween on diametrically opposite locations of the core. The outer surfaces of the magnets define a cylindrical surface. A retention and encircles the magnets. The band has a width substantially less than the width of the magnets including opposite ends overlapped and aligned with a securement gap. The core has a first hole aligned with the securement gap. A securement unit has a seat engaging the overlapping ends and a stem in the core hole to lock the band in holding engagement. The head is located within the cylindrical surface. A second hole is diametrically spaced from the first hole and aligned with a second gap. The second hole is formed to balance the rotor and may also receive a second securement unit to establish the band tension. The securement unit is shown as a T-shaped member having a pin which is wedged or threaded into the hole. The securement unit is also shown as an axially elongated wedge and the core hole is an axially elongated slot, with the opposite ends of the band wedge within the opposite sides of the slot.

8 Claims, 2 Drawing Sheets

PERMANENT MAGNET ROTOR WITH MAGNET RETENTION BAND

This is a division of application Ser. No. 190,703, filed May 5, 1988 now U.S. Pat. No. 4,855,630.

BACKGROUND OF THE PRESENT INVENTION

The present invention relates to a permanent magnet rotor having a permanent magnet retention band unit for reliably and firmly securing the permanent magnets to the rotor under operating conditions.

Permanent magnet motors are well known in the art. In such structures, the cylindrical rotor is formed with a magnetic core structure. A plurality of circumferentially distributed permanent magnets are secured to the periphery of the rotor to define a rotating magnetic field within the motor unit. The centrifugal forces which arise as a result of the rotation for the rotor require special design consideration in securing of the magnet to the rotor core. If any magnet becomes loose and is thrown outwardly, it will move into damaging engagement with the stator and may result in total destruction of the motor. At best, a loose module will require significant rebuilding and repair of the motor. Conventionally, means are provided for locking of the magnet within the core such as by a suitable adhesive and physical interlocking of the magnet to the core. A well known and widely used method includes a band member encircling the rotor and forming a securement of the permanent magnets to the rotor. In such structures, the band should be of a minimum thickness to maintain a minimal air gap between the rotor and the stator. Although various banding devices and systems are used, they are generally an expensive construction and must be carefully secured to the rotor assembly. The bands are permanently affixed in place and repair of the rotor is again at best expensive and difficult.

SUMMARY OF THE PRESENT INVENTION

The present invention is particularly directed to an improved rotor banding apparatus and method for permanent magnet rotors and particularly to provide for convenient and relatively low cost production or fabrication of the rotor while establishing and maintaining a safe and reliable long-life construction.

Generally in accordance with the present invention, the permanent magnets are secured abutting the outer periphery of the rotor core with the magnets appropriate circumferentially spaced about the core and spaced from each other. A thin non-magnetic band is wrapped about the magnet with the opposite ends of the band extended inwardly in the space between the magnets and firmly secured to the rotor care. In circumferentially spaced relation to the secured ends, a further securement of the band is established between the band and the rotor core. The band is deflected inwardly at the tension control location to provide a predetermined tension in the band to thereby establish and effect the desired holding force on the magnets without undue stress of the magnets. The apparatus and method permits the use of a minimum thickness band so as to minimize the air gap while readily adapting the method to production process fabrication for the permanent magnet rotor. More particularly in a preferred and commercial construction, the band is formed of a thin stainless steel strap. The width and the thickness of the band is selected to establish the necessary holding force over the face of the magnets under all anticipated or permissible operating conditions. In assembly, the magnets are accurately secured to the rotor through a suitable adhesive. The band is then wrapped about the magnets with the ends of the strap aligned with the securement location of the rotor core between two adjacent spaced magnets. The band is uniquely and preferably coupled to the core through a mechanical connection. A particularly satisfactorily mechanical connection is a press fit connection wherein an opening is formed in the core. A pin passes through aligned openings in the overlapping ends of the tension or the securement band. The pin is pressed into the core to firmly secure the bands together and abutting the core. Diametrically opposite to the end securement, a corresponding space exists between the adjacent magnets. A tension control pin is passed through an opening in the band and pressed into a corresponding opening in the core to establish a predetermined tension on the band and thereby establishing the necessary and desired holding force on the magnets. In the construction, the pins are a semispherical device interposed between the band to provide a reliable smooth interconnection without creating stress points in the band.

Other forms of similar coupling elements can of course be employed. For example, simple screw members or the like can be used and inserted in appropriately drilled and tapped openings in place of the pins.

In another embodiment, the opposite ends of the band may be projected into a slot openings with a wedge member wedged between the ends of the band to secure them in place within the core. This construction eliminates the necessity for separate openings in the ends of the band but will require accurate formation of the slot and wedge construction to maintain a balanced rotor construction and a firm securement of the ends of the band within the core.

The tension in the band can be readily automatically detected during fabrication using an automated testing apparatus such as by coupling of a tension sensing device to the band in spaced relation to the securement means and generally in the areas of other spacements between the plurality of magnets on the core.

The present invention provides a reliable securement of magnets to a rotor core with a minimum air gap requirement and in a practical cost effective fabrication method.

BRIEF DESCRIPTION OF THE DRAWINGS

The drawings furnished herewith generally illustrate the best mode presently contemplated for the invention and are described hereinafter.

In the drawings.

DESCRIPTION OF THE ILLUSTRATED EMBODIMENT

Figure 1:
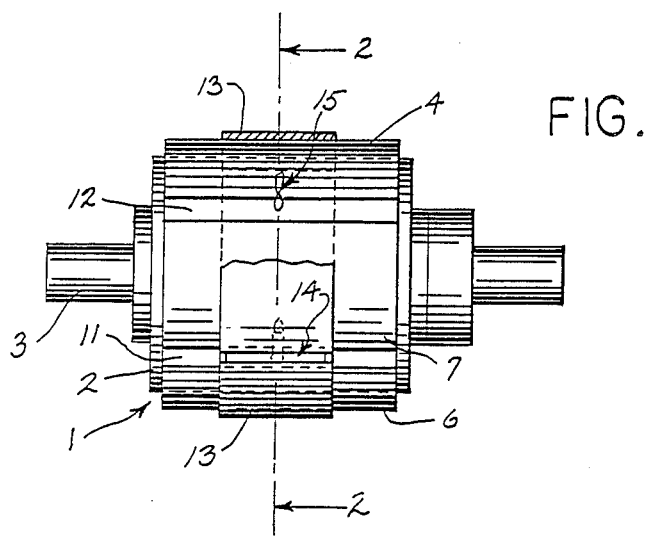
FIG. 1 is a side elevational view of a rotor having a plurality of magnets secured to a core in accordance with an embodiment of the invention.
Figure 3:
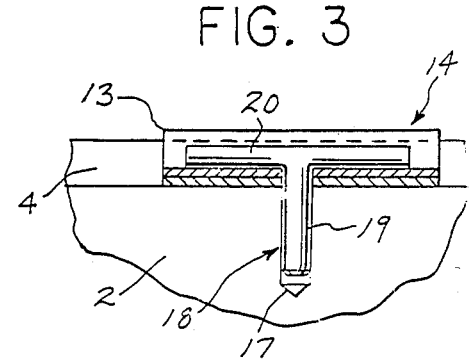
FIG. 3 is a view taken on line 3—3 of FIG. 2.
Figure 2:
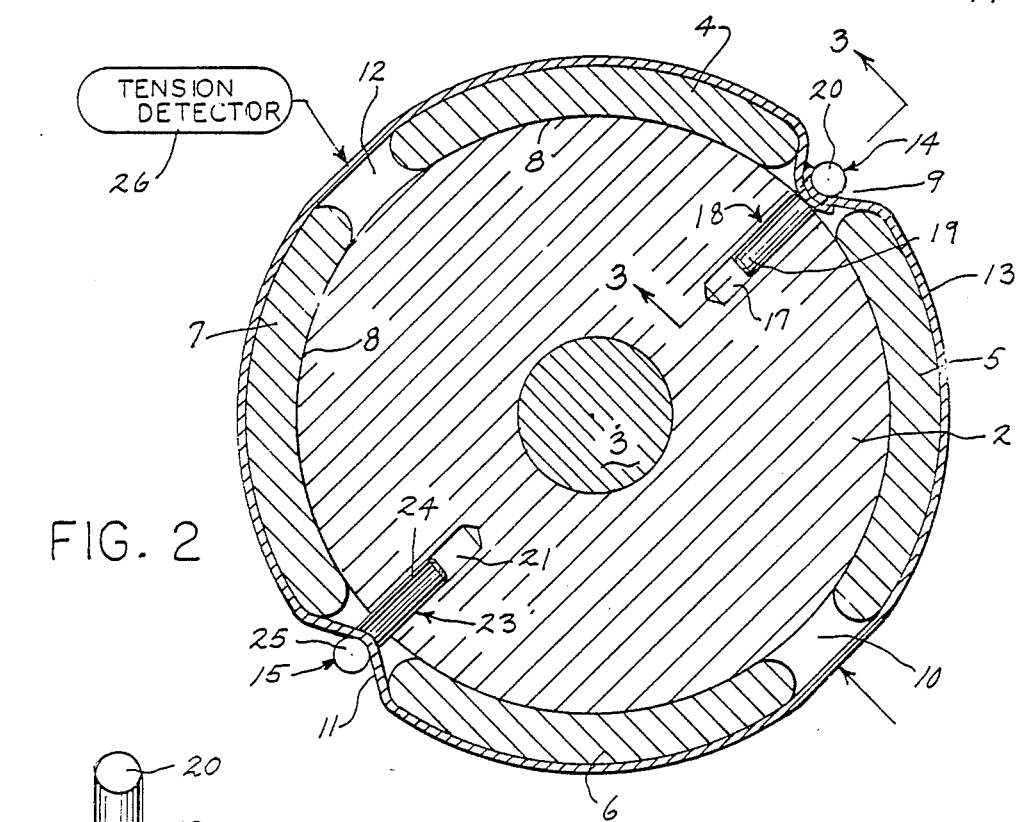
FIG. 2 is an enlarged vertical section taken on line 2—2 of FIG. 1.

Referring to the drawings and particularly to FIG. 1, a plan view of a rotor 1 generally constructed in accordance with the teaching of the present invention is diagrammatically illustrated. The rotor 1 forms the rotating part of a motor assembly in accordance with any known or desired construction. The illustrated rotor 1 includes an inner core 2 which can be formed as a solid machined part having an outer round circumference and oppositely extending rotor shafts 3 for mounting of the rotor within the motor or other electrical device. A plurality of permanent magnets 4, 5, 6, and 7 are secured in equicircumferentially spaced relation to the outer surface of the core 2. Each of the magnets 4–7, inclusive, is identically constructed and is shown as a generally solid permanent element having a curvature corresponding to the curvature of the core 2 and adapted to be mounted in close fitting interengagement with the face of the core. An adhesive 8 is interposed between the face of the core 2 and the face of the magnets 4–7 during the initial assembly to fix each magnet to the core in precise predetermined circumferential spaced relation. A small circumferential air gap 9, 10, 11 and 12 extends between the several magnets 4–7 inclusive. The magnets are axially or radially polarized and establish an alternating field not shown about the rotor. The core, magnets and the resulting flux field created are well known and no further description or explanation thereof is necessary or given herein. The magnets 4–7 secured to the face of the rotor core 2 are subjected to significant outward centrifugal forces under high speed operating conditions. In accordance with the teaching of the present invention, a non-magnetic securement band encircles the magnets 4–7 and is rigidly secured to the core 2 through a suitable mechanical connection 14 in the gap 9 between the magnets 4 and 5 as shown for example in FIGS. 1–3. The band 13 is tightly drawn about the magnets to establish a predetermined holding force required for a particular motor design. A tension control connection 15 secures the band 13 to the core 2 in the gap 11 between magnets 6 and 7. The band 13 is selected with a minimum thickness and of an approximate width to securely lock the magnets 4–7 to the core. The controlled tension in the band 13 permits use of thin band with introduction of a minimum air gap between the rotor and stator, not shown.

Figure 4:
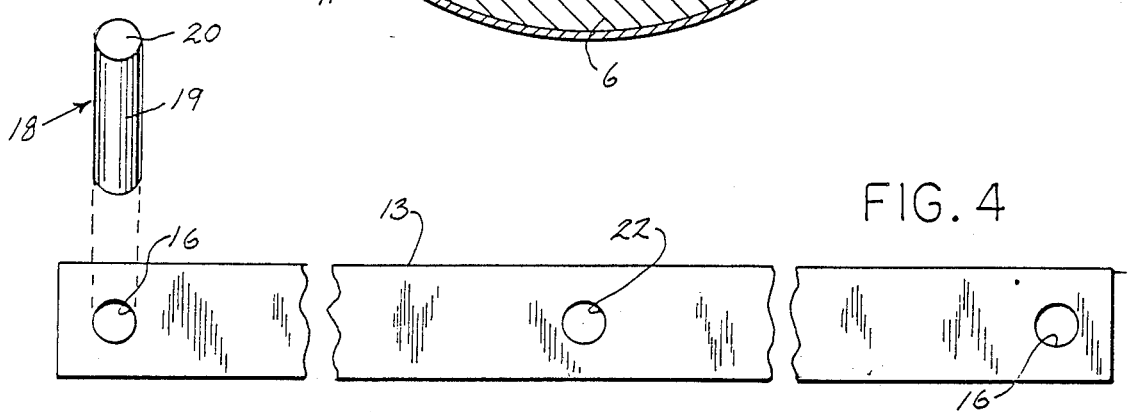
FIG. 4 is an exploded view of a banding unit shown in FIGS. 1-3.

More particularly in the embodiment of the invention shown in FIGS. 1–4, the band 13 as illustrated is formed as a simple flat strip with openings 16 on the opposite ends, as most clearly shown in FIG. 4. The band 13 is wrapped about the central portion of the magnets 4–7 which are adhesively bonded to the core with the openings 16 aligned with each other and with gap 9. The core 2 is formed with a radial hole 17 in the gap 9. The band 13 is wrapped about the core and magnets with the overlapping openings 16 aligned with the opening 17 in the core. A T-shaped pin 18 has its stem 19 projected through the band openings 15 and 16 and into the core hole 17. The head 20 of the T-shaped pin 18 is a cylindrical member of a diameter less than the spacing of the magnet or gap 9. The round head 20 engages the outer end of band 13 and forces the band inwardly between the magnets 4 and 5. The deflection of the band between the magnets draws the band snuggly around the magnets and establishes an initial holding force on the magnets. The round surface of the head 20 engaging the band distributes the stresses and minimizes concentration of the force within a limited area of the band. The construction is such that the pin member 18 is bottomed onto the core 2 with the overlapping band ends abutting the core to establish the initial holding force.

A hole 21 is provided in the core diametrically located from the first hole 17 to receive the tension control connection 15 of the band. The band 13 includes an opening 22 aligned with such second core hole 21. A similar T-shaped pin 23 projects through the second hole 22 in the band 3 and into the second core hole 21. The tension control pin 23 is forced inwardly with the stem 24 locked within the hole 21 to further tension the band 13 about the rotor and particularly the permanent magnets 4–7. The design is made such that the rounded head 25 of the second pin 23 deflects the band inwardly into the space between the magnets 6 and 7 such that the head 25 is within the outer circumference defined by the projection of the outer magnet surfaces. The pin 23 is further projected inwardly sufficient to establish the required tension in the band 13 for establishing and maintaining a desired holding force on the permanent magnets.

For accurate securement, the tension in the band 13 may be monitored during the assembly or fabrication of the rotor. A tension detecting or measuring device 26 may be coupled to the band in circumferentially spaced to the two connections 14 and 15, as shown diagrammatically in FIG. 2 at gap 12. Device 26 is any known or suitable tension detection apparatus and no further description is necessary.

In fabrication, the tension controlling pin 23 is inserted into the hole 21 and forced therein until such time as a desired minimum tension is created in the band to complete fabrication of the rotor.

The design readily adapts itself to the formation of a permanent magnet rotor with the permanent magnet securely held in position during the operation of the motor. The band is readily formed from any suitable stainless steel stock or other suitable banding material. The pins are also readily formed with modern day technology. Thus, the method of adhesively bonding the magnet to the core is well known as is the necessary forming of the openings and machining of the several surfaces. The assembly process is particularly adapted to mass production processing.

Figure 5:
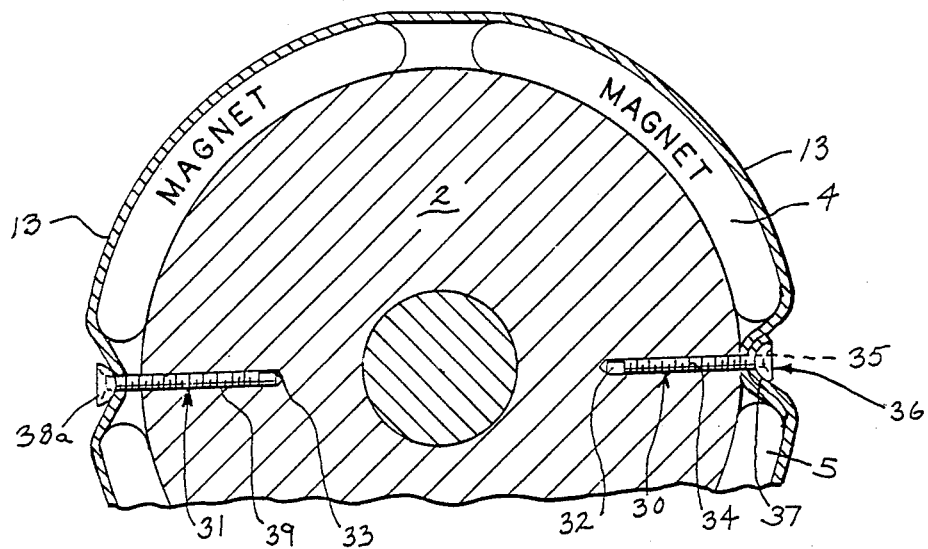
FIG. 5 is a fragmentary view similar to FIG. 2 illustrating an alternate embodiment.

FIG. 5 illustrates an alternate embodiment of the invention in which the clamping pin units 18 and 23 are replaced by T-shaped screw units 30 and 31 as more fully described presently. The rotor may be otherwise essentially formed as in the first embodiment and the corresponding elements are correspondingly identified for purposes of simplicity and clarity of explanation and description.

Figure 6:
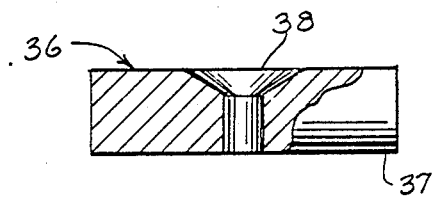
FIG. 6. is an exploded view of a portion of the clamp unit shown in FIG. 5.

In the embodiments of FIGS. 5 and 6, the band retention holes 32 and 33 are threaded. Referring to the T-shaped screw unit 30 includes a screw 34 correspondingly threaded to the retention hole 32. The screw head 35 passes through a clamping cross-head element 36. The cross-head element 36 is a metal rod having a curved undersurface 37 abutting the overlapping ends of the band 13 with an opening 38 aligned with the openings 16 in the band and the core hole 32. The head opening 38 has a smooth concave surface portion to accommodate the head 35 of the screw 34. In the assembly, the band 13 is again wrapped about the magnets 4–7 inclusive with the openings 16 in the end portions of the band aligned with the threaded hole 32 in the core 2. Screw 34 is passed through the hole in the cross-head element 36 and the openings 16 in the end portions of the band 13 and threaded into the core hole 32. The screw 34 is drawn tightly into the threaded hole 32 and clamps the band 13 onto the face of the core 2 between the magnets 4 and 5, with the cross-head element 36 lying within the projected surface of the band 13. T-shaped unit 31 includes a threaded screw 37 and a cross-head element 38 and is assembled to the opposite side of the band 13. The screw 37 is turned into the threaded hole 33 on the opposite side of the core 2 to create the necessary holding tension in the band.

The assembly thus essentially corresponds to that of the first embodiment. The advantages of the second embodiment are the use of a standard screw unit and use of a simple tapped hole in the core. This avoids the necessity for any close tolerance surfaces which might be required to establish an effective holding force for long periods of time with the pin type connection shown in the first embodiment. The screw unit and threaded holes can be readily formed.

Figure 7:
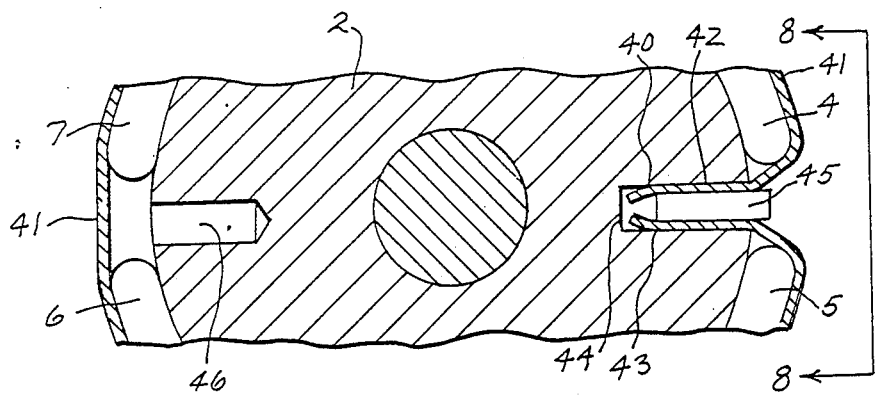
FIG. 7 is a fragmentary view similar to FIGS. 4 and 5 showing a third embodiment.
Figure 8:
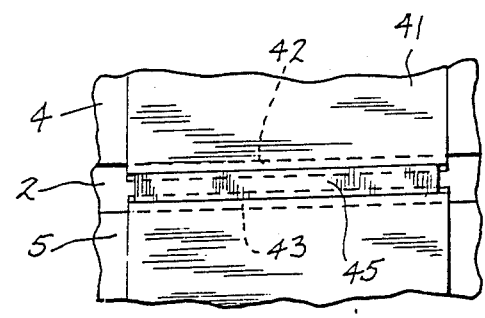
FIG. 8 is a fragmentary sectional view taken generally on line 8—8 of FIG. 7.

In both of the embodiments shown and described in FIGS. 1-6, the retention band 13 is apertured to accommodate the band attaching the mechanical connection 14 and the tension control mechanical connection 15 of the band 13 to the core 2. This requires that the band be designed and selected to provide significant strength in the band adjacent the openings to support and carry the tension forces required for holding of the permanent magnets reliably to the core. This generally would require increasing the width or thickness of the band. An alternate embodiment eliminating the connection apertures in the band structure is illustrated in FIGS. 7 and 8. In the third embodiment, the core and magnetic assembly may be formed in any desired manner such as illustrated in the first two embodiments and corresponding elements are again correspondingly numbered for simplicity and clarity of explanation. In the third embodiment, the core 2 is formed with a clamping slot 40 between two of the permanent magnets 4 and 5. The slot 40 has an axial length at least as great as the width of a clamping band 41. The band 41 is formed again as an elongated strap of a length somewhat greater than the circumference defined by the permanent magnets 4-7 and with sufficient length for the opposite ends 42 and 43 to project downwardly from the adjacent magnets into the slot 40, as shown in FIG. 7. The terminal ends of the strap or band 40 are spaced from the base 44 of the slot 40 to allow the tensioning of the band 41 by pulling the opposite ends 42 and 43 of the band into the slot 40. A wedge member 45 is inserted into the slot between the ends of the band within the slot and as the wedge is driven inwardly, it pulls the band inwardly. The wedge 45 thus serves to simultaneously firmly and fixedly secure the band 41 about the rotor and simultaneously establishes the desired tension in the band for establishing the desired or necessary holding force.

As the band 41 is driven inwardly, a tension detector can be coupled to the band 40, as in the first embodiment, and the wedge 45 inserted until the desired tension is created.

The slot and wedge are preferably formed with a complementing tapered construction to facilitate entrance of the wedge into the slot while simultaneously providing a reliable and effective pulling of the band into the slot and firmly holding the band in place during the operation of the motor assembly.

A drilled hole 46 is shown in the core 2 diametrically located with respect to the band connection. The hole 46 is drilled or formed to balance the rotor structure.

In this embodiment, the band is a continuous uninterrupted band thereby providing a maximum strength characteristic. The band itself can then be made of a somewhat thinner stainless or other suitable metal. The thinner band of course again minimizes the necessary air gap between the rotor and the associate stator, not shown.

In all embodiments, the centrifugal forces are thus absorbed by the band which in combination with the adhesive bonding establishes and maintains firm, reliable positioning of the permanent magnets on the round unobstructed circumferential surface of the rotor core.

Thus, the present invention provides a very thin retaining band in common with the mechanical coupling to the rotor core and provides a simple, reliable and effective retention construction for the permanent magnets of a rotor device. The structure and method of forming is adapted to commercial mass production technology and is highly cost effective.

Various modes of carrying out the invention are contemplated as being within the scope of the following claims and particularly pointing out and distinctly claiming the subject matter which is regarded as the invention.

I claim:

1. The method of forming a permanent magnet rotor for a dynamoelectric machine, comprising forming a rotor core having a smooth cylindrical outer surface, forming a plurality of permanent magnets having a curvature corresponding to the curvature of said core and adapted to be disposed by abutting engagement with said circumferential surface of said core, adhesively bonding a plurality of magnets in equicircumferentially spaced relation to said core, said magnets being assembled in axial alignment and circumferentially spaced from each other to define at least first and second diametrically located gaps establishing access to said core,
wrapping a retention band having free ends about said magnets with said ends aligned with one of said gaps,
pulling said band tightly about said magnets and securing said free ends to said core to establish a predetermined tension in said band to fix said magnets to said core.

2. The method of claim 1 including providing a securement unit coupled to the ends of said bands and having an exterior surface within the circular projection of said magnets, and wherein said securing of said free ends includes forming a hole in said core in at least one of said gaps, aligning said securement unit with said gap, and inserting said securement unit within said hole to fix said band to said core, said inserting deflecting ends of said band into the gap between said magnets.

3. The method of claim 2 including the forming of a second hole in said core diametrically spaced from said first hole, affixing a tension control element coupled to said band in alignment with said second hole, and inserting said tension control element in said second band and deflecting said band into said gap to establish the predetermined tension in said band.

4. The method of claim 1 including providing first and second circumferentially spaced openings in said gaps, providing said band member as an elongated strap having a constant cross section and a length greater than the circumference of a circle defined by the outer surface of said permanent magnets and with the opposite ends of said band having corresponding openings and with an intermediate portion of said band having an opening, said wrapping of said band locating said end openings aligned with one of said openings in said core and said central opening of said band with said second opening in said core, and inserting mechanical connectors through said aligned openings to secure said band and to deflect said band inwardly to establish said predetermined tension in said band for establishing a predetermined band holding force.

5. The method of claim 4 wherein said mechanical connectors include a locking pin corresponding to said openings and said inserting includes forcing the pin through the band openings into said core opening until the head abutts said band and said pin is firmly secured in said core opening with said head located inwardly of the outermost surface of said band.

6. The method of claim 2 wherein said core openings include a radial slot located between said magnets, and including the steps of bending the opposite ends of said band into said slot and abutting the opposite faces of said slot, and inserting a tapered wedge member of said securement unit into said slot to firmly secure said end members into clamping engagement between the wedge and the slot to firmly secure the band member to said core.

7. The method of forming a rotor structure having a rotor core having a cylindrical outer surface and a plurality of permanent magnets having an inner face complementing said outer surface, comprising the steps of adhesively bonding said magnets to said core with circumferentially spaced gaps between said magnets, wrapping a retention band about said magnets, said band having a width substantially less than the width of the magnets and of predetermined length including opposite ends aligned with a first of said gaps, said opposite ends being overlapped at said gap and having aligned openings, said core having a first hole aligned with said first of said gaps, a securement pin unit including a head means larger than said band openings, inserting said pin through said openings with the head abutting the exterior of said overlapping ends and projecting into said hole and holding said overlapping ends radially inwardly of said magnets' outer surface.

8. The method of claim 7 including forming a second hole in said core diametrically spaced from said first hole and in a second of said gaps, forming an intermediate opening in said band and aligning said intermediate opening with said second hole, and inserting a second pin through said intermediate opening in said band and into said second hole to set the tension in said band.

* * * * *